United States Patent
Kubale et al.

(10) Patent No.: US 6,525,511 B2
(45) Date of Patent: Feb. 25, 2003

(54) ADAPTER FOR A POWER TOOL BATTERY

(75) Inventors: Mark Kubale, West Bend, WI (US); David Rozwadowski, Milwaukee, WI (US); Pamela Stegehuis, Helenville, WI (US); Robert Crisp, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/755,537

(22) Filed: Jan. 5, 2001

(65) Prior Publication Data

US 2002/0089306 A1 Jul. 11, 2002

Related U.S. Application Data

(60) Provisional application No. 60/224,662, filed on Aug. 11, 2000.

(51) Int. Cl.[7] .................................................. H02J 7/00
(52) U.S. Cl. ....................................... 320/112; 320/114
(58) Field of Search ................................ 320/112, 113, 320/114, 115

(56) References Cited

U.S. PATENT DOCUMENTS

| | | |
|---|---|---|
| 4,006,396 A | 2/1977 | Bogut |
| 4,123,598 A | 10/1978 | Hammel |
| 4,186,983 A | 2/1980 | Kaye |
| 4,315,364 A | 2/1982 | Leffingwell |
| D278,704 S | 5/1985 | Claxton et al. |
| 4,530,034 A | 7/1985 | Kawarada |
| 4,576,880 A | 3/1986 | Verdier et al. |
| 4,737,420 A | 4/1988 | Ikeda et al. |
| 4,746,298 A | 5/1988 | Hollander |
| 4,943,498 A | 7/1990 | Cooper et al. |
| 4,969,206 A | 11/1990 | Desrochers |
| 5,057,383 A | 10/1991 | Sokira |

(List continued on next page.)

FOREIGN PATENT DOCUMENTS

| | | |
|---|---|---|
| DE | 2618748 A1 | 11/1977 |
| DE | 4216045 A1 | 11/1993 |
| DE | 9404008 U1 | 7/1994 |
| DE | 4402355 A1 | 8/1995 |
| EP | 0255568 A2 | 2/1988 |
| EP | 0545132 B1 | 6/1993 |
| EP | 0561423 A2 | 9/1993 |
| EP | 0572327 A1 | 12/1993 |
| EP | 0707350 A1 | 4/1996 |
| EP | 0786821 A1 | 7/1997 |
| JP | 3052555 | 3/1991 |
| WO | WO95/00992 | 1/1995 |

OTHER PUBLICATIONS

IBM, Automatic Charge Rate Adjustment for Multiple Batteries, Technical Disclosure Bulletin, Mar. 1994, vol. 37 No. 03, IBM.

Makita, Makita's 24V Maximum Cordless with MakStar System, Press Release, Jul. 28, 2000, La Mirada, CA—Makita USA, Inc.

*Primary Examiner*—Gregory J. Toatley, Jr.
(74) *Attorney, Agent, or Firm*—Michael Best & Friedrich LLP

(57) ABSTRACT

An adapter for a power tool battery. The adapter enables a battery having a first configuration, such as a "slide-on" configuration, to be used with a power tool and/or to be charged by a battery charger having a second configuration, such as a "tower" configuration. The adapter may also enable a battery having one general configuration, such as a "slide-on" configuration or a "tower" configuration, and a first connecting structure to be used with a power tool and/or to be charged by a battery charger having the same general configuration, such as the "slide-on" configuration or the "tower" configuration, respectively, and a second connecting structure different than the first connecting structure.

41 Claims, 13 Drawing Sheets

U.S. PATENT DOCUMENTS

| | | | |
|---|---|---|---|
| 5,132,800 A | * 7/1992 | Wada et al. | 348/372 |
| 5,136,229 A | * 8/1992 | Galvin | 320/112 |
| 5,144,217 A | 9/1992 | Gardner et al. | |
| 5,151,727 A | 9/1992 | Sasaki | |
| 5,187,422 A | 2/1993 | Izenbaard et al. | |
| 5,200,686 A | 4/1993 | Lee | |
| 5,200,690 A | 4/1993 | Uchida | |
| 5,227,262 A | 7/1993 | Ozer | |
| 5,229,701 A | 7/1993 | Leman et al. | |
| 5,248,927 A | 9/1993 | Takei et al. | |
| 5,341,171 A | 8/1994 | Mori et al. | |
| 5,391,972 A | 2/1995 | Gardner et al. | |
| 5,602,454 A | 2/1997 | Arakawa et al. | |
| 5,620,808 A | 4/1997 | Wheeler et al. | |
| 5,659,236 A | 8/1997 | Hahn | |
| 5,686,808 A | 11/1997 | Lutz | |
| 5,718,985 A | 2/1998 | Bunyea et al. | |
| 5,734,253 A | 3/1998 | Brake et al. | |
| D396,687 S | 8/1998 | Somers | |
| D397,084 S | 8/1998 | Siddoway | |
| 5,818,197 A | * 10/1998 | Miller et al. | 320/107 |
| 5,926,005 A | 7/1999 | Holcomb et al. | |
| 6,075,341 A | 6/2000 | White et al. | |
| 6,104,162 A | * 8/2000 | Sainsbury et al. | 320/107 |
| 6,181,032 B1 | * 1/2001 | Marshall et al. | 200/321 |
| 6,308,059 B1 | 10/2001 | Domes | |
| 2001/0017531 A1 | 8/2001 | Sakakibara et al. | |

* cited by examiner

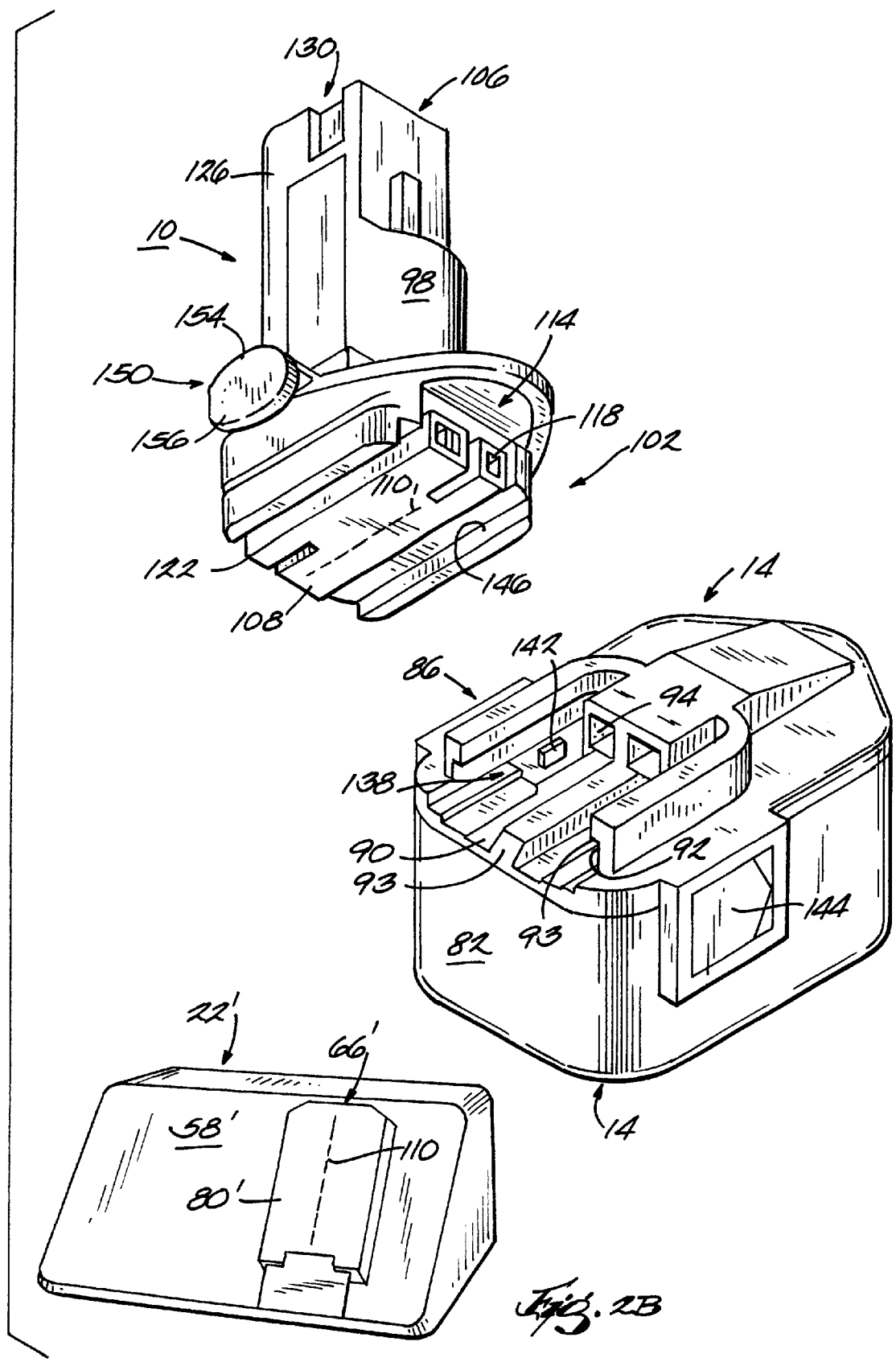

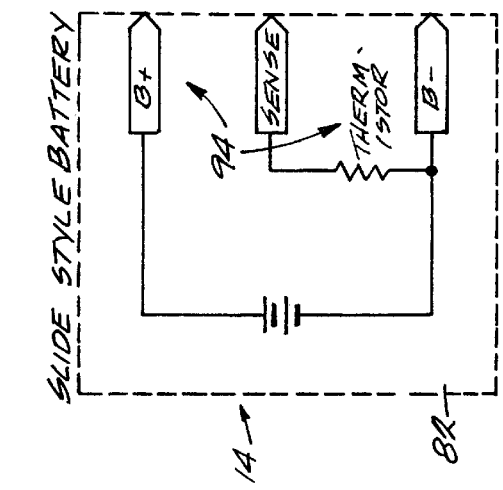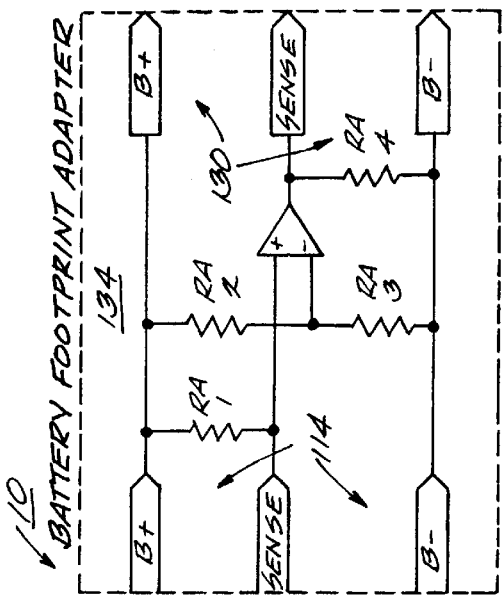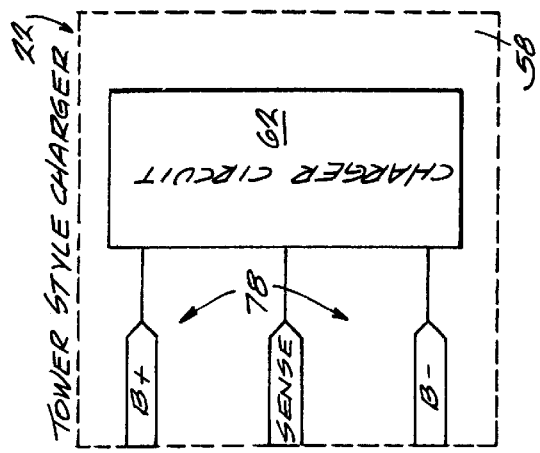
Fig. 3A
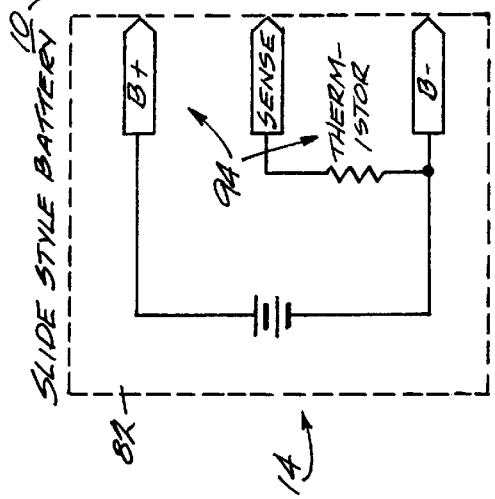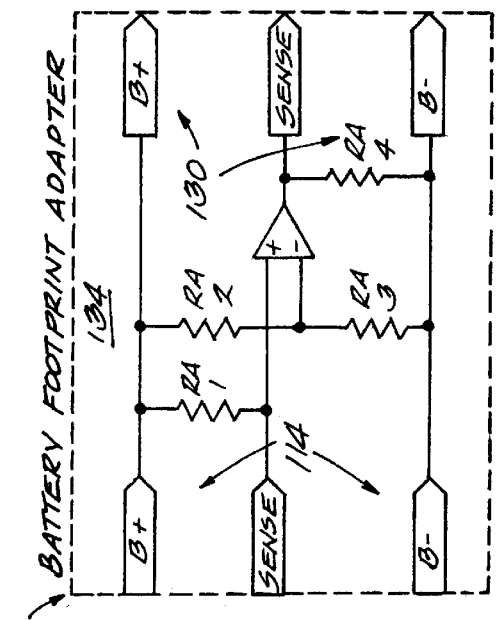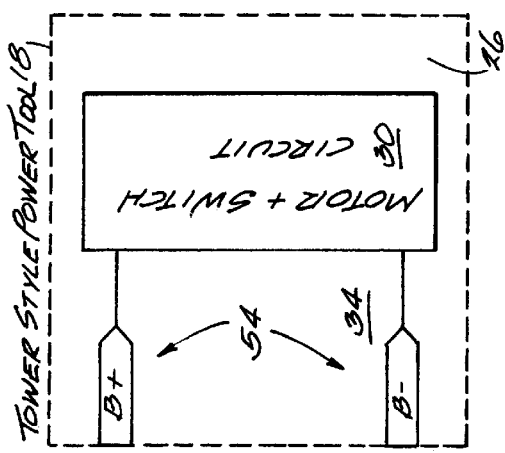
Fig. 3B

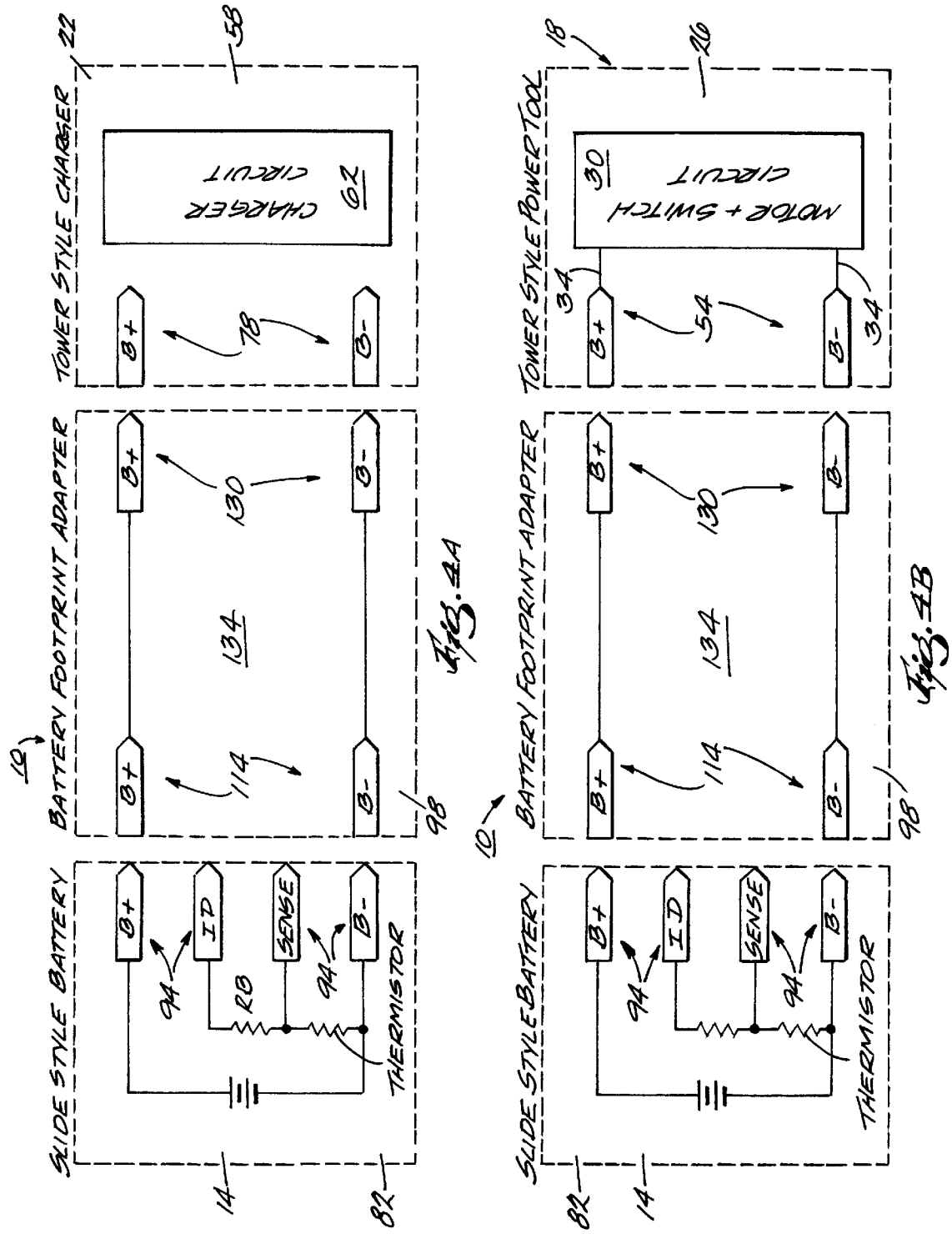

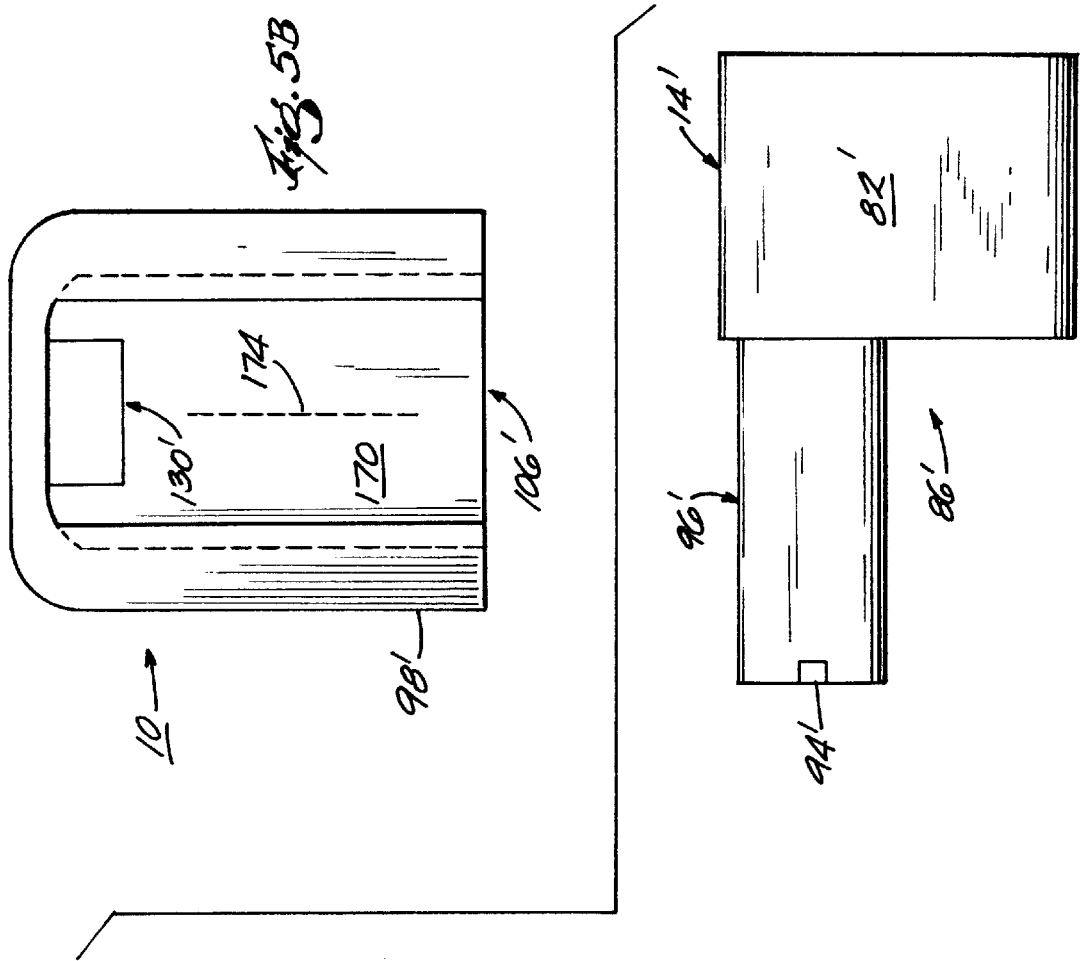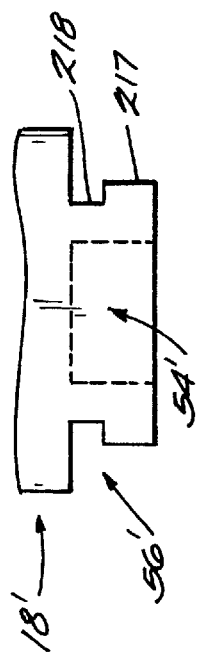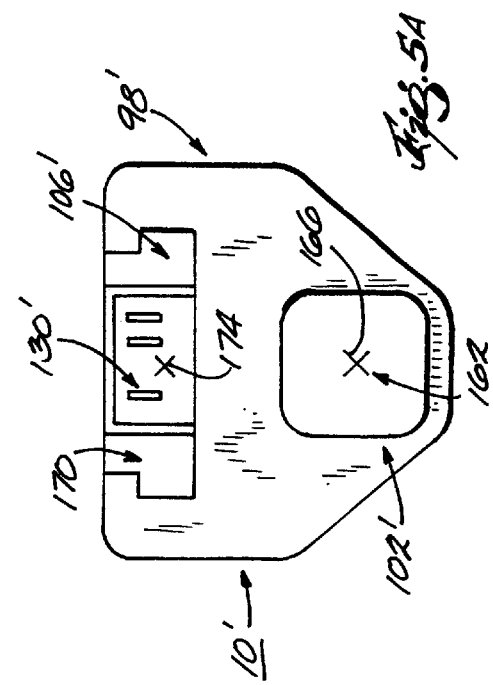

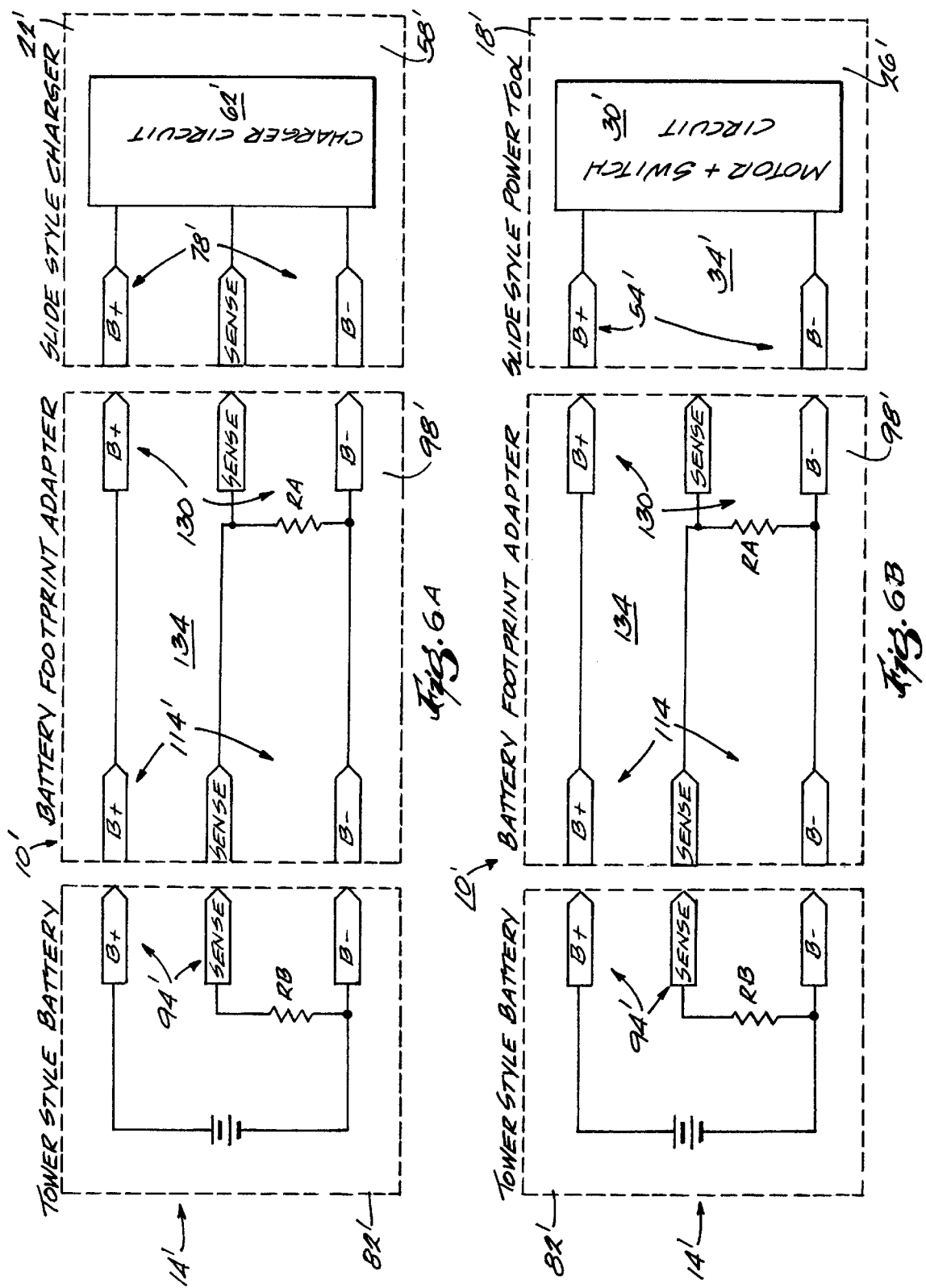

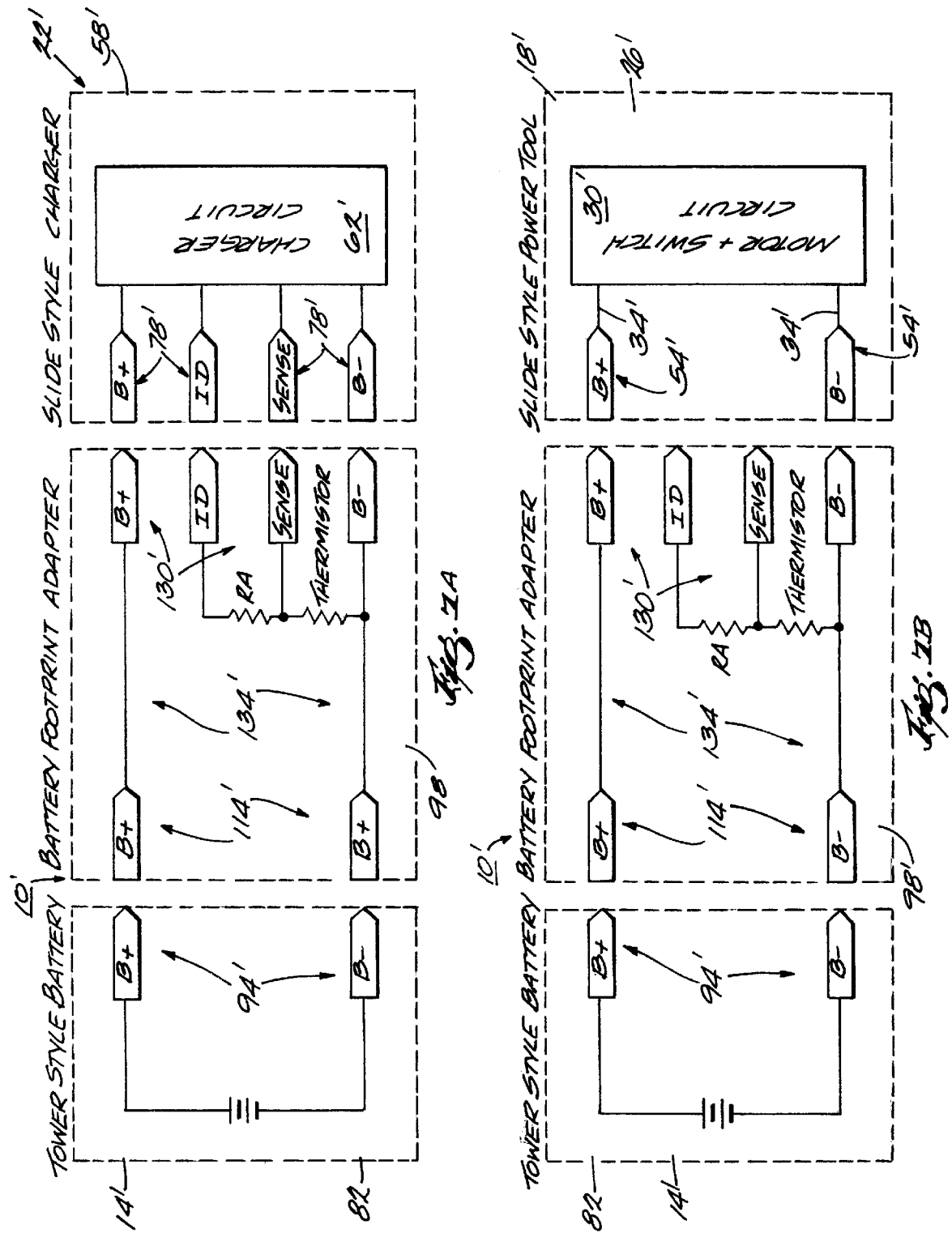

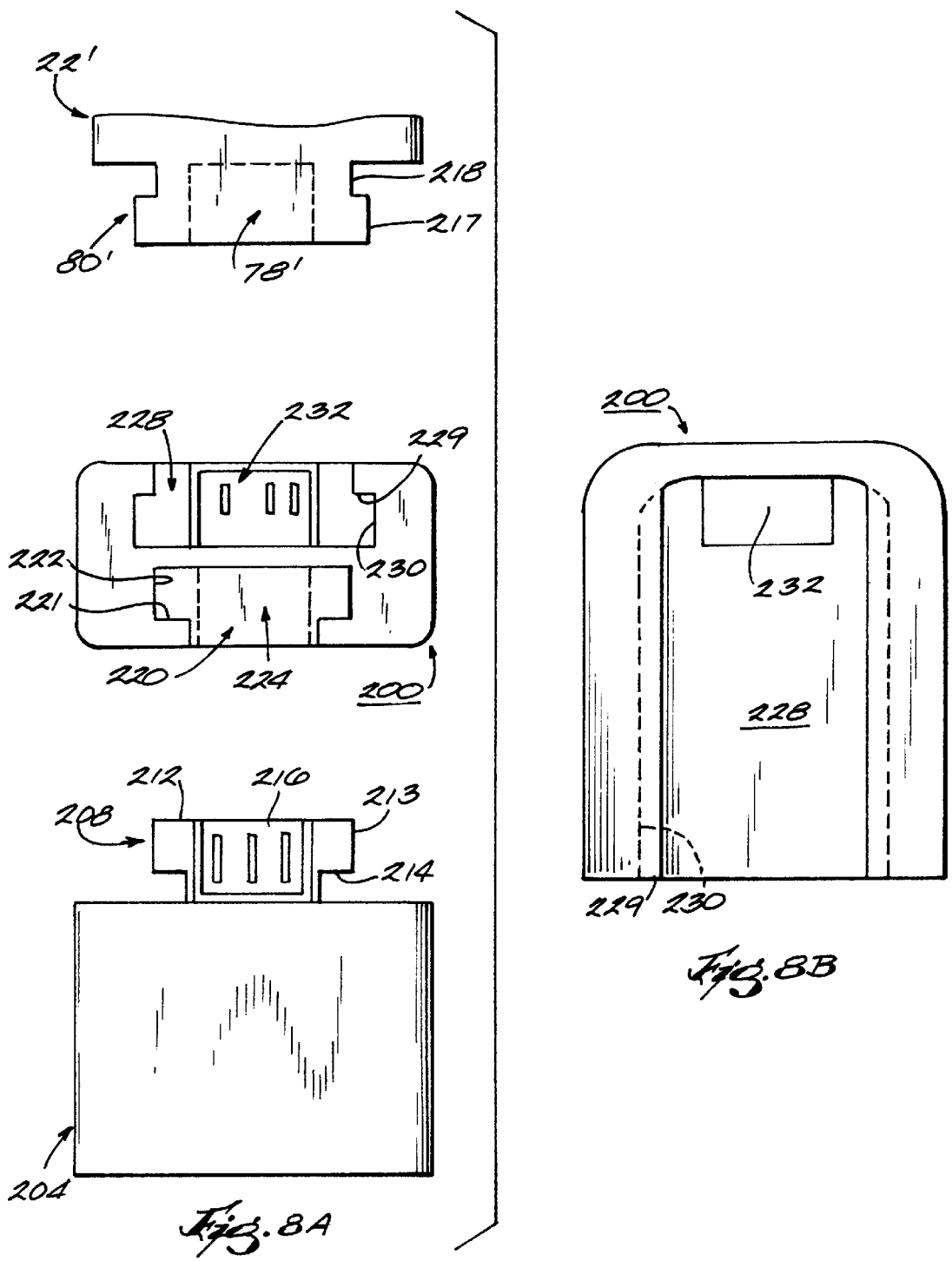

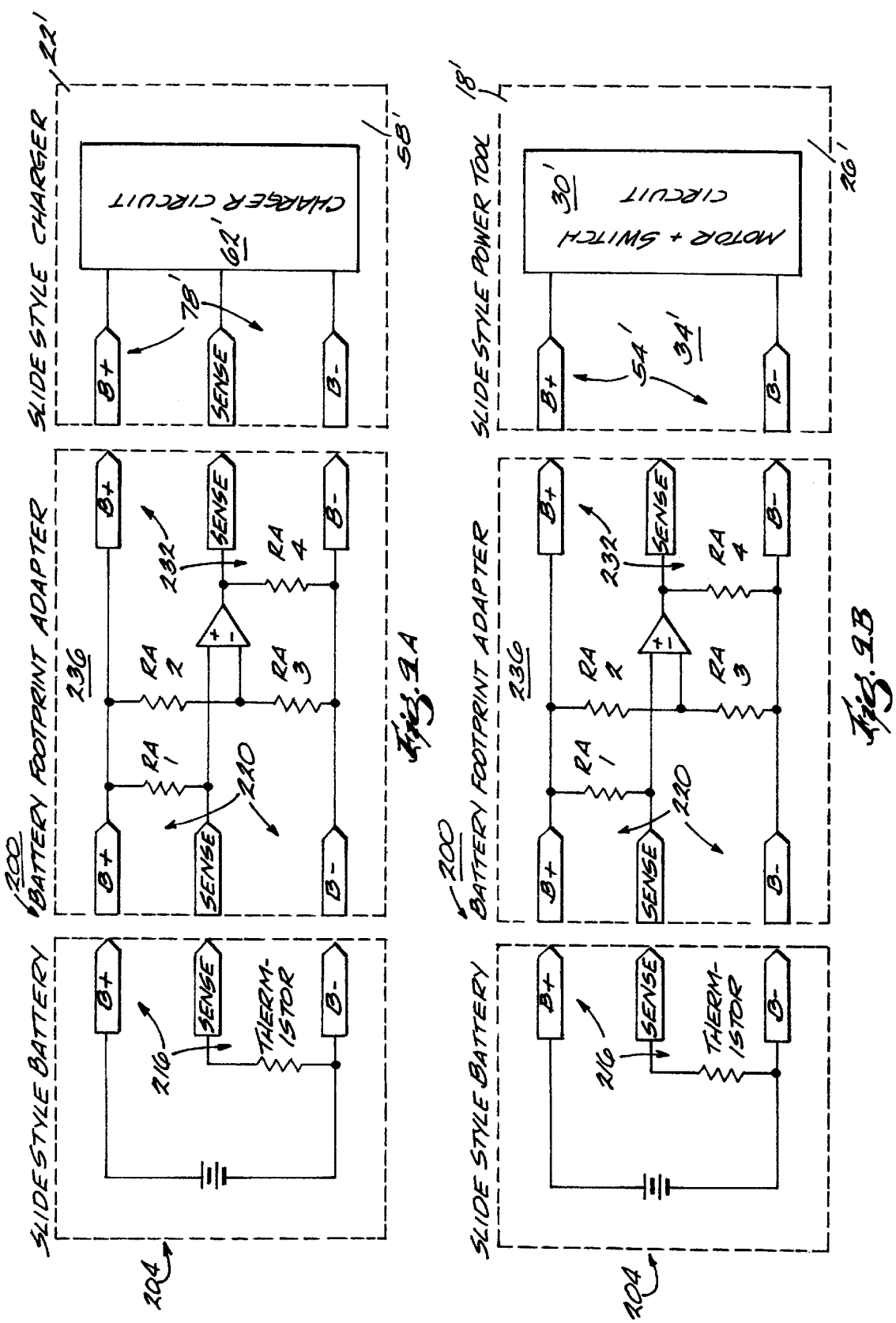

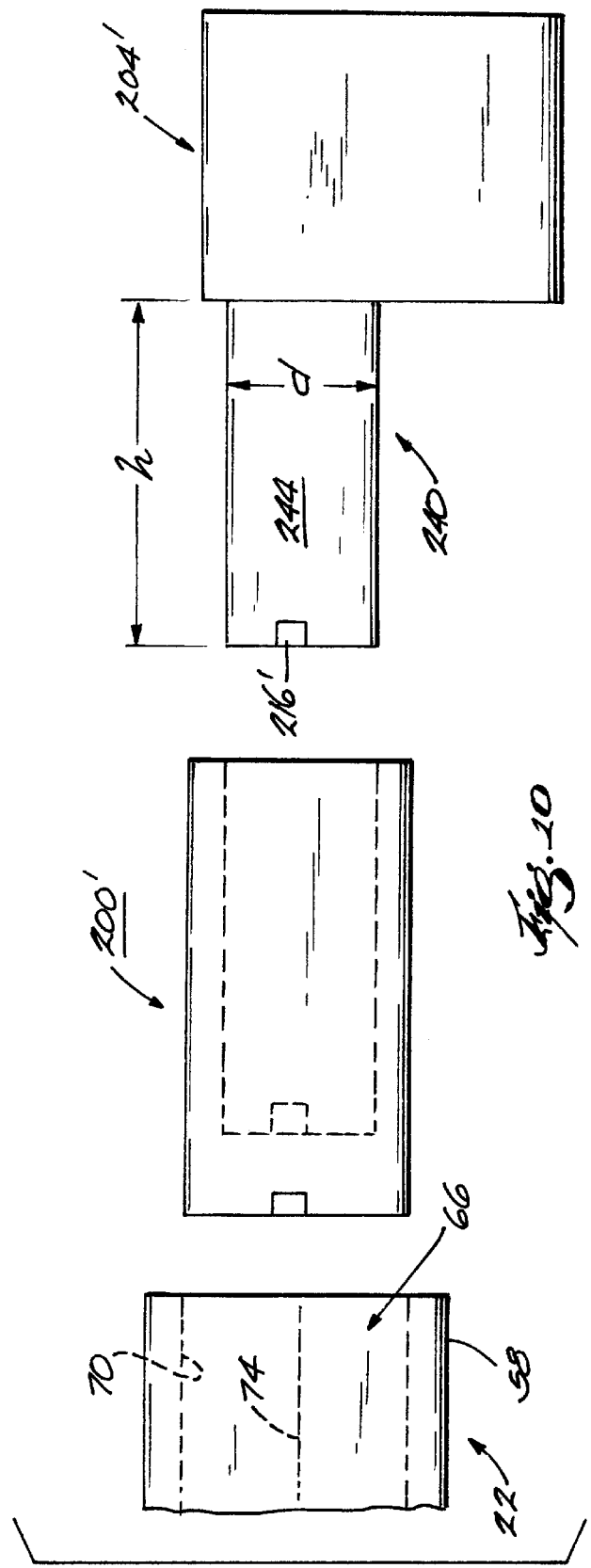

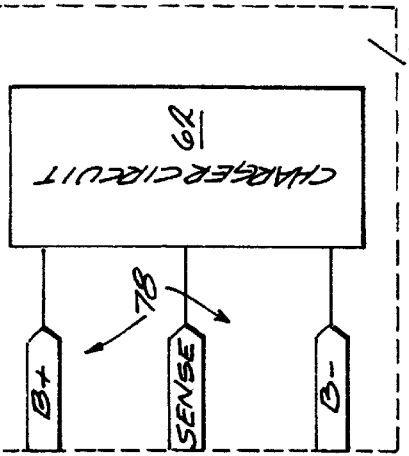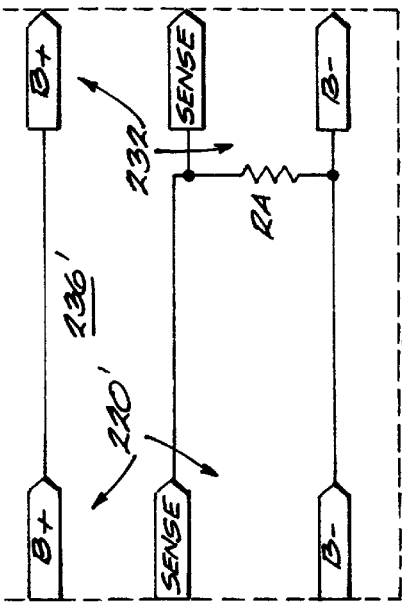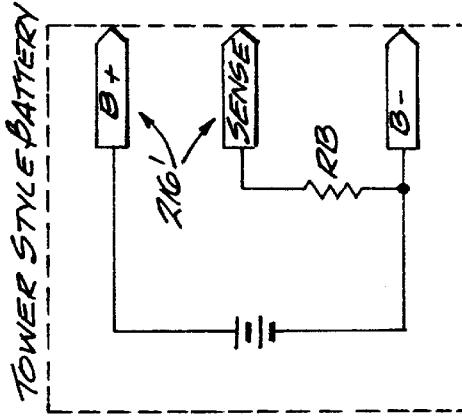
Fig. 11A
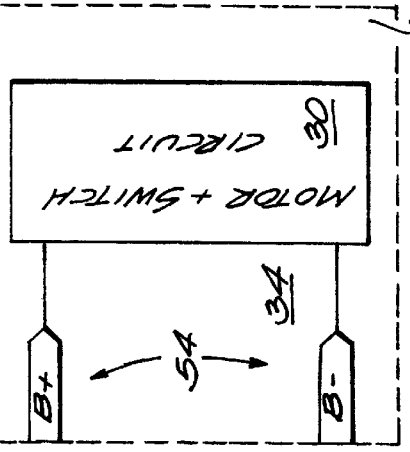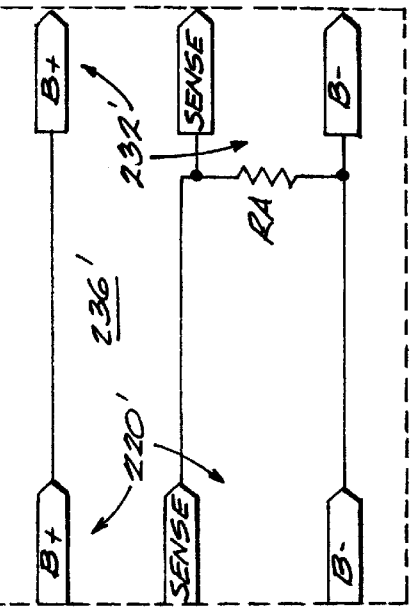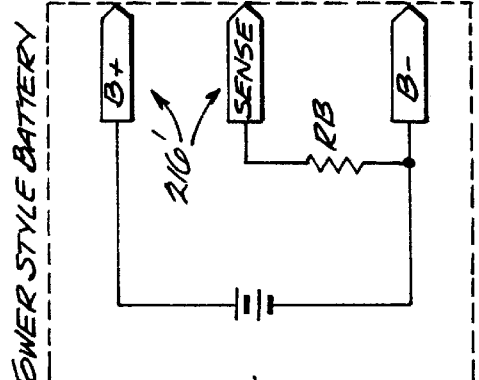
Fig. 11B

ADAPTER FOR A POWER TOOL BATTERY

RELATED APPLICATIONS

The present application claims the benefit of co-pending provisional application Ser. No. 60/224,662, filed Aug. 11, 2000.

BACKGROUND OF THE INTENTION

The present invention relates to cordless power tools and, more particularly, to an adapter for a power tool battery.

Generally, a cordless power tool includes a tool housing and an electric motor supported by the housing and operable to drive a tool element. A power tool battery is supported by the housing and is electrically connectable to the motor to selectively supply power to the motor.

To charge the battery, a battery charger is provided. Typically, a battery charger includes a charger housing and a charging circuit supported by the charger housing and electrically connectable to a power source. The battery is supported by the charger housing and electrically connected to the charging circuit so that power is selectively supplied to the battery to charge the battery.

There are two types of general configurations for a power tool battery (and for the power tool and the battery charger). The first type is the "tower" battery configuration. In the "tower" configuration, a portion of the tool housing, such as the handle, defines an opening, and the battery includes a "tower" or insertion portion which is inserted into the opening to support the battery on the tool housing and to electrically connect the battery to the motor. To charge the "tower" battery, the charger housing defines a similar opening, and the "tower" portion of the battery is inserted into the opening in the charger housing to support the battery on the charger housing and to electrically connect the battery to the charging circuit.

The second type of battery configuration is the "slide-on" configuration. In the "slide-on" configuration, the tool housing includes a support portion, and the battery slides onto the support portion. The support portion and the battery include inter-engaging connecting structure to physically connect the battery to the tool housing and to electrically connect the battery to the motor. To charge the "slide-on" battery, the charger housing includes a similar support portion, and the battery and the charger housing include similar inter-engaging connecting structure to physically connect the battery to the charger housing and to electrically connect the battery to the charging circuit.

In each general configuration, many different battery constructions (and power tool/battery charger constructions) exist. In each construction, the battery (and the power tool/battery charger) includes a specific connecting structure (size, shape, connectors, position of connectors, etc.) for physically connecting the battery to the power tool and/or to the charger and for electrically connecting the battery to the motor and/or to the charging circuit.

SUMMARY OF THE INVENTION

One problem with the above-described battery arrangements is that a battery having one configuration, such as the "slide-on" configuration, is not useable with a power tool having another configuration, such as the "tower" configuration, or vice versa.

Another problem with the above-described battery arrangements is that a battery having one configuration, such as the "slide-on" configuration, cannot be charged by a charger having the other configuration, such as the "tower" configuration, or vice versa.

Yet another problem with the above-described battery arrangements is that a battery having one general configuration, such as a "slide-on" configuration with a first connecting structure, may not be useable with a power tool of the same general configuration but having a different connecting structure, such as a power tool including a "slide-on" configuration but with a different second connecting structure. The differences in the connecting structures, to physically and/or electrically connect the battery to the power tool, prevent the battery from being used with the power tool. The same applies for "tower" batteries and "tower" power tools having different connecting structures.

A further problem with the above-described battery arrangements is that the battery having a one general configuration, such as a "slide-on" battery with a first connecting structure, may not be chargeable by a battery charger having the same general configuration but having a different connecting structure, such as a "slide-on" battery charger having a second connecting structure configuration. The differences in the connecting structure, to physically and/or electrically connect the battery to the battery charger, prevent the battery from being charged by the battery charger. The same applies for "tower" batteries and "tower" battery chargers having different connecting structures.

The present invention provides an adapter for a power tool battery which substantially alleviates the problems with the above-described battery arrangements. More particularly, in some constructions, the invention provides an adapter which is used to connect a battery having a first general configuration, such as a "slide-on" configuration or a "tower" configuration, to a power tool and/or to a battery charger having a second general configuration, such as the "tower" configuration or the "slide-on" configuration, respectively. In other constructions, the invention provides an adapter which is used to connect a battery having a first general configuration, such as the "slide-on" configuration or the "tower" configuration, and a first connecting structure to a power tool and/or to a battery charger having the same first general configuration and a second connecting structure different than the first connecting structure.

More particularly, the invention provides an electrical combination comprising an electrical component including a component housing, a battery electrically connectable to the electrical component to transfer power between the electrical component and the battery, and an adapter separate from and connectable between the battery and the component housing to support the battery on the component housing and, preferably, to electrically connect the battery to the electrical component.

Also, the invention provides an electrical combination comprising a power tool including a housing and an electric motor supported by the housing and operable to drive a tool element, a battery electrically connectable to the motor to selectively power the motor, and an adapter separate from and connectable between the battery and the housing to support the battery on the housing and, preferably, to electrically connect the battery to the motor.

In addition, the invention provides an electrical combination comprising a battery charger including a charger housing and a charging circuit supported by the charger housing and selectively connectable with a power source, a battery electrically connectable with a charging circuit such that the charging circuit selectively supplies power to the battery to charge the battery, and an adapter separate from and connectable between the housing and the battery to support the battery on the housing and, preferably, to electrically connect the battery to the charging circuit.

Preferably, the battery includes a terminal assembly and the electrical component includes a component terminal assembly. The adapter preferably includes a first adapter terminal assembly electrically connectable to the battery terminal assembly and a second adapter terminal assembly electrically connectable to the component terminal assembly to electrically connect the battery to the electrical component.

In one construction, the component housing defines an opening and the adapter includes an insertion portion which is insertable into the opening to support the adapter on the component housing. The electrical component preferably includes a component terminal assembly supported in the opening, and the adapter includes an adapter terminal assembly supported on the insertion portion. The adapter terminal assembly is electrically connected to the component terminal assembly when the insertion portion is inserted into the opening.

The adapter preferably includes a battery support portion connected to the insertion portion, and the battery is connectable to and supportable by the support portion. Preferably, the battery is connectable to the support portion along a battery attachment axis generally perpendicular to the opening axis.

The battery may be selectively connectable to the support portion along the battery attachment axis in a first direction, in which the battery is supported in a first orientation relative to the housing, and in a second direction, in which the battery is supported in a second orientation relative to the housing. The battery is preferably selectively connectable to the support portion in the first direction, in which the battery is supported in a first orientation relative to the adapter, and in the second direction, in which the battery is supported in a second orientation relative to the adapter.

The adapter preferably includes a forward first terminal assembly and a rearward first terminal assembly. In the first orientation, the battery terminal assembly is electrically connected to the forward first terminal assembly, and, in the second orientation, the battery terminal assembly is electrically connected to the rearward first terminal assembly.

Preferably, the battery has a first connection configuration, and the housing has a second connection configuration different than the first connection configuration. The adapter preferably includes a first connecting portion having the first connection configuration and a second connecting portion having the second connection configuration. The first connecting portion is connectable with a battery to connect the battery to the adapter, and the second connecting portion is connectable with the housing to connect the adapter to the housing.

The connection configurations of the battery and the electrical component may be different general configurations ("slide-on" or "tower") or may be the same general configuration but with different physical connecting structure and/or with different electrical connecting structure. In one construction, one connection configuration is a "tower" configuration, and the other configuration is a "slide-on" configuration. In other constructions, the first connection configuration is a first "tower" configuration or a first "slide-on" configuration, and the second configuration is a second "tower" configuration or a second "slide-on" configuration, respectively, having different physical connecting structure and/or different electrical connecting structure.

The combination preferably further comprises a first locking assembly for locking the battery to the adapter and a second locking assembly for locking the adapter to the component housing.

Further, the invention provides an electrical combination comprising a power tool including a tool housing and an electric motor supported by the tool housing and operable to drive a tool element, a battery charger including a charger housing and a charging circuit supported by the charger housing and selectively electrically connectable with a power source, a battery, and an adapter separate from and connectable between the battery and one of the power tool and the battery charger to support the battery on the one of the power tool and the battery charger and to transfer power between the battery and the one of the power tool and the battery charger.

In one construction, the adapter is alternatively connectable between the battery and the power tool to support the battery on the power tool and between the battery and the battery charger to support the battery on the battery charger. In another construction, the battery is connectable without the adapter to the other of the power tool and the battery charger.

One independent advantage of the present invention is that, with some constructions of the present adapter, a battery having one configuration, such as a "slide-on" configuration, may be used with a power tool having another configuration, such as a "tower" configuration.

Another independent advantage of the present invention is that, with some constructions of the present adapter, a battery having one configuration, such as a "slide-on+ configuration, may be charged by a battery charger having another configuration, such as a "tower" configuration.

Yet another independent advantage of the present invention is that, with some constructions of the present adapter, a battery having one general configuration, such as a "slide-on" configuration or a "tower" configuration, and a first connecting structure may be used with a power tool having the same general configuration, such as the "slide-on" configuration or the "tower" configuration, respectively, and a second connecting structure different than the first connecting structure.

A further independent advantage of the present invention is that, with some constructions of the present adapter, a battery having one general configuration, such as a "slide-on" configuration or a "tower" configuration, and a first connecting structure may be charged by a battery charger having the same general configuration, such as the "slide-on" configuration or the "tower" configuration, respectively, and a second connecting structure different than the first connecting structure.

Other independent features and independent advantages of the present invention will become apparent to those skilled in the art upon review of the following detailed description, claims and drawings.

BRIEF DESCRIPTION OF THE DRAWINGS

FIGS. 1A and 1B are perspective views of an electrical combination including the adapter embodying the invention and illustrating the connection of the adapter between an electrical component, such as a power tool, and a battery.

FIGS. 3A and 3B are schematic diagrams illustrating the connection of a battery having a "slide-on" configuration to an electrical component having a "tower" configuration.

FIGS. 4A and 4B are schematic diagrams similar to FIGS. 3A and 3B.

FIGS. 5A and 5B are views of an alternate construction of an adapter embodying the invention.

FIGS. 6A and 6B are schematic diagrams illustrating the connection of a battery having a "tower" configuration to an electrical component having a "slide-on" configuration.

FIGS. 7A and 7B are schematic diagrams similar to FIGS. 6A and 6B.

FIGS. 8A and 8B are views of another alternate construction of an adapter embodying the invention.

FIGS. 9A and 9B are schematic diagrams illustrating the connection of a "slide-on" battery having a first connecting structure to a "slide-on" electrical component having a second connecting structure.

FIG. 10 is a side view of yet another alternate construction of an adapter embodying the invention.

FIGS. 11A and 11B are schematic diagrams illustrating the connection of a "tower" battery having a first connecting structure to a "tower" electrical component having a second connecting structure.

Figure 1A:
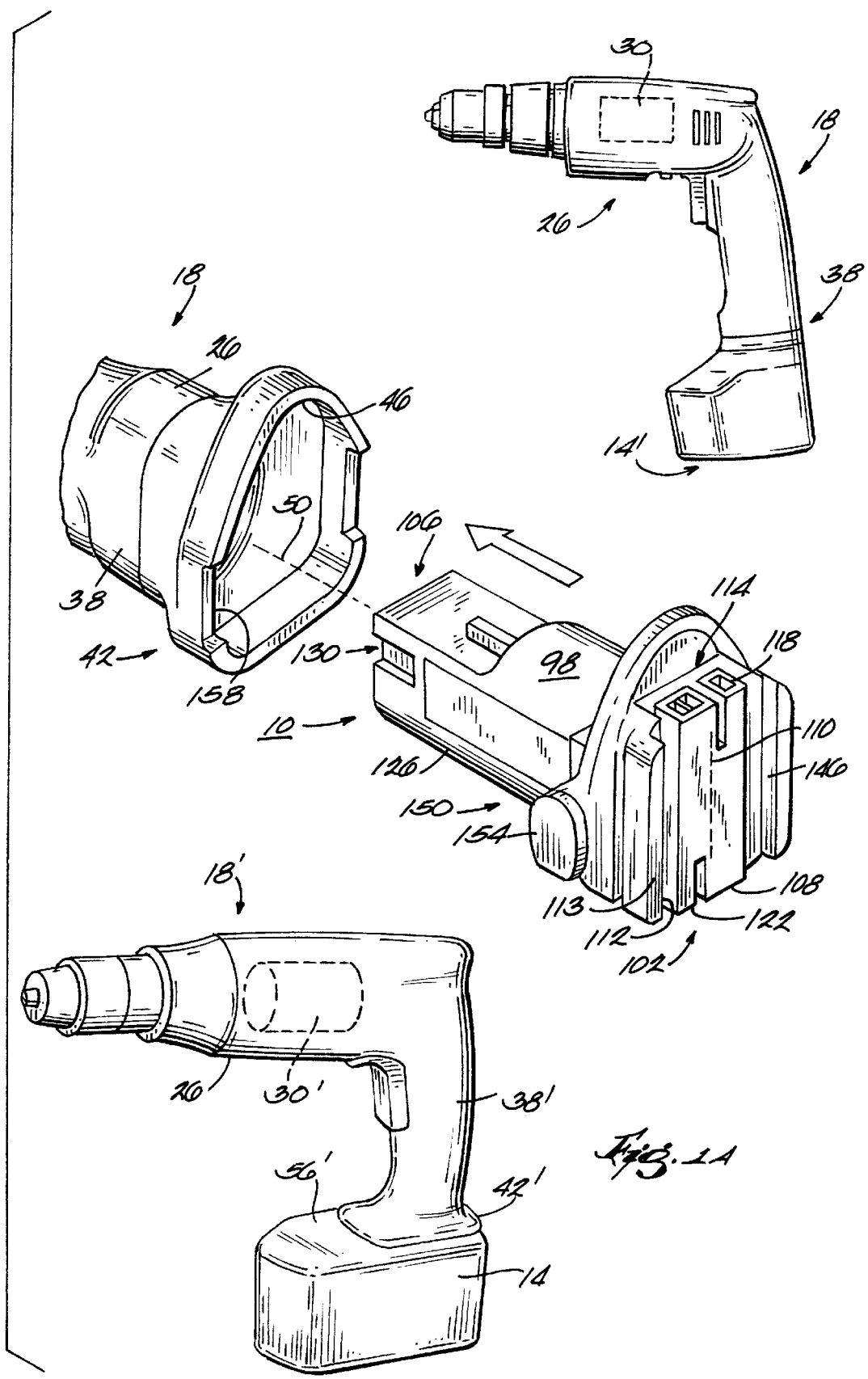

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 2B:
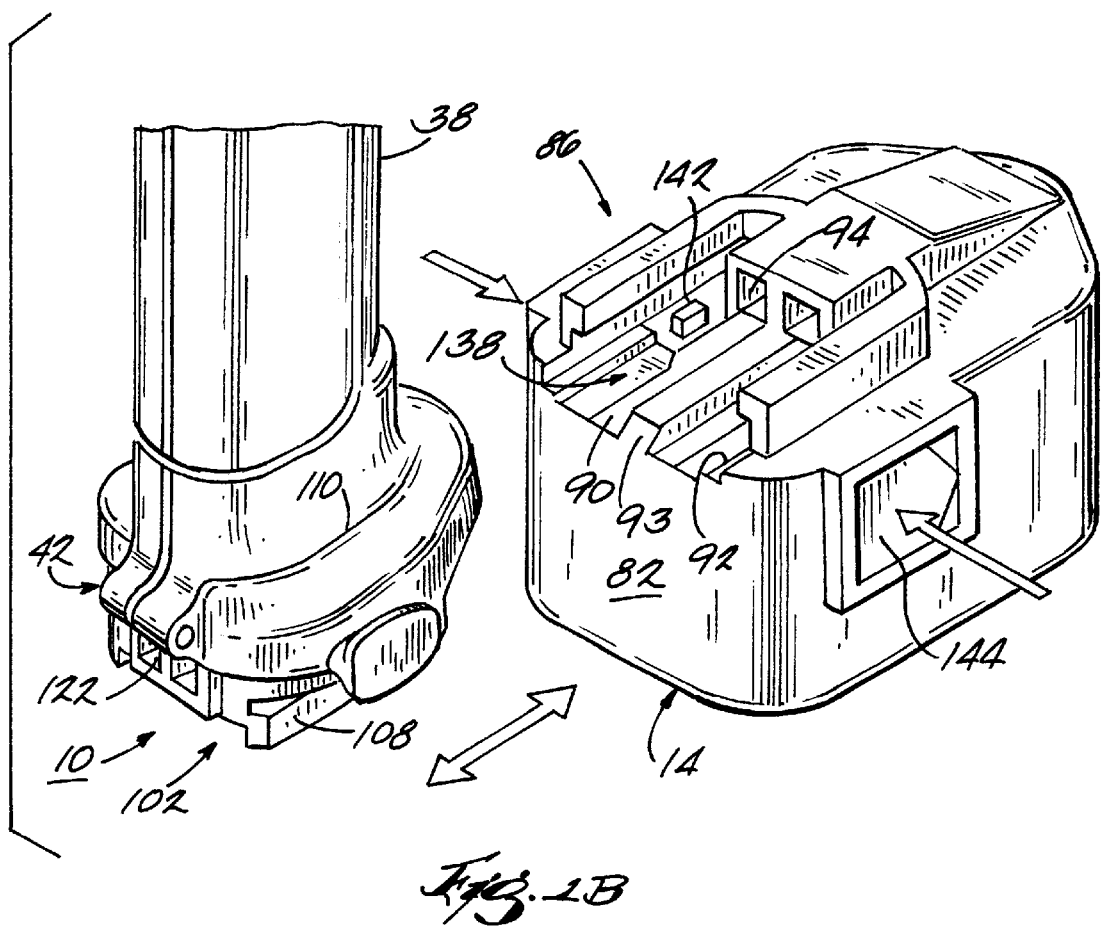
FIGS. 2A and 2B are perspective views of another electrical combination including the adapter and illustrating connection of the adapter between another electrical component, such as a battery charger, and the battery.
Figure 2A:
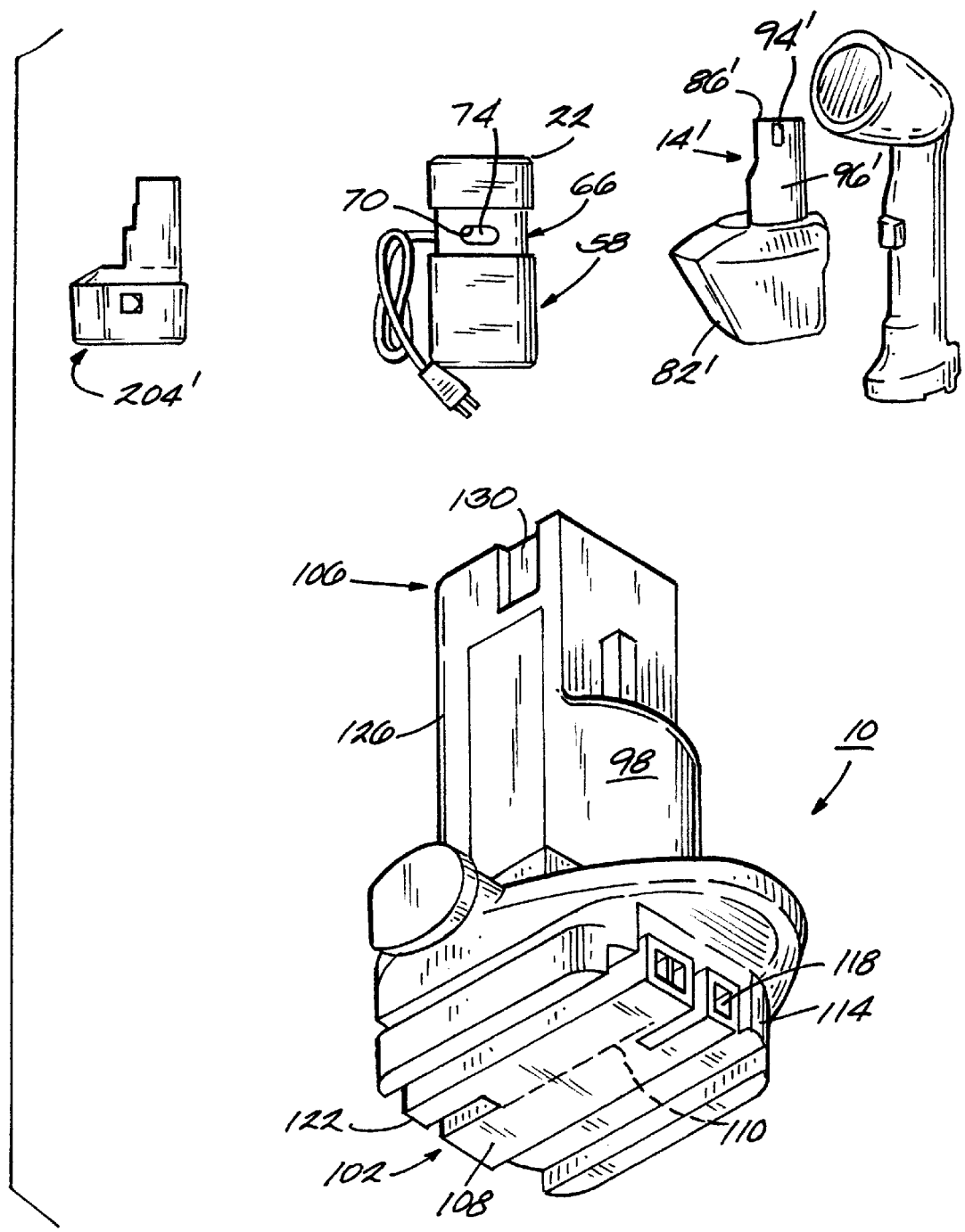

An electrical combination including an adapter 10 for a power tool battery 14 is illustrated in FIGS. 1–2. The electrical combination also includes an electrical component, such as a power tool 18 (partially shown in FIGS. 1A and 1B) and/or a battery charger 22 (shown in FIGS. 2A and 2B). It should be understood that the electrical component may be any type of electrical component, such as, for example, a radio, audio device or flashlight, which is usable with a power tool battery.

As shown in FIGS. 1A and 1B, the power tool 18 includes a tool housing 26 and an electric motor 30 (schematically illustrated in FIGS. 3B and 4B) supported by the tool housing 26 and operable to drive a tool element (not shown). An electrical circuit 34 (schematically illustrated in FIGS. 3B and 4B) is electrically connected with the motor 30 to electrically connect the motor 30 to a power source, such as the battery 14. The tool housing 26 also includes a handle portion 38.

The power tool 18 includes a connection configuration 42 for connecting the power tool 18 to a battery. In the illustrated construction, the connection configuration 42 of the power tool 18 is a "tower" configuration. A portion of the tool housing 26, such as the handle portion 38, defines an opening 46 extending along an opening axis 50. In this configuration, a motor terminal assembly 54 (schematically illustrated in FIGS. 3B and 4B) is supported in the opening 46 and is electrically connected to the electrical circuit 34 and to the motor 30. Typically, the "tower" power tool 18 is used with a "tower" battery 14', shown in FIGS. 1A and 2A and described below in more detail, without the use of an adapter.

As shown in FIG. 1A, a second power tool 18' includes a second connection configuration 42' which is different than the connection configuration 42 of the first power tool 18. The second connection configuration 42' is a "slide-on" connection configuration. In the "slide-on" connection configuration 42', the handle portion 38' includes (see FIG. 5A) a support portion 56' on which a motor terminal assembly 54' is supported. The "slide-on" battery 14, shown in FIGS. 1A, 1B and 2A and described below in more detail, may be used with the "slide-on" power tool 18' without the use of an adapter.

As shown in FIGS. 2A, the battery charger 22 includes a charger housing 58 and a charging circuit 62 (schematically illustrated in FIGS. 3A and 4A) supported by the charger housing 58 and electrically connectable to a power source (not shown) and to a battery to charge the battery. In the illustrated construction, the battery charger 22 includes a "tower" connection configuration 66, which is similar to the connection configuration 42 of the "tower" power tool 18. In the "tower" connection configuration 66, the charger housing 58 defines an opening 70 extending along an opening axis 74. A charger terminal assembly 78 (schematically illustrated in FIGS. 3A and 4A) is supported in the opening 70 and is electrically connected to the charging circuit 62. Typically, the "tower" charger 22 is used to charge the "tower" battery 14' (shown in FIGS. 1A and 2A) without the use of an adapter.

As shown in FIG. 2B, a second battery charger 22' includes a connection configuration 66' which is different than the connection configuration 66 of the first battery charger 22. The second connection configuration 66' is a "slide-on" connection configuration, which is similar to the connection configuration 42' of the "slide-on" power tool 18'. The "slide-on" connection configuration 66' includes (see FIG. 8A) a support portion 80' and charger terminal assembly 78' supported on the support portion 80'. Typically, the "slide-on" battery 14 can be charged by the "slide-on" charger 22' without the use of an adapter.

As shown in FIGS. 1B and 2B, the battery 14 includes a battery housing 82 supporting one or more rechargeable battery cells (not shown). The battery 14 has a connection configuration 86 which is different than the connection configuration 42 of the power tool 18 and different than the connection configuration 66 of the battery charger 22. In the illustrated construction, the connection configuration 86 is a "slide-on" connection configuration. In the "slide-on" connection configuration 86, the battery housing 82 includes a connecting portion 90 having grooves 92 and projections 93, and a battery terminal assembly 94 is supported on the connecting portion 90. The battery terminal assembly 94 is electrically connected to the rechargeable battery cell(s) and is connectable, with the adapter 10, to the motor 30 to supply power to the motor 30 and to the charging circuit 62 such that the charging circuit 62 selectively supplies power to charge the battery 14. As discussed above, the "slide-on" battery 14 may be used with the "slide-on" power tool 18' and may be charged by the "slide-on" battery charger 22' without the use of an adapter.

As shown in FIG. 2A, the second battery 14' includes a different connection configuration 86' than the connection configuration 86 of the battery 14. In this construction, the connection configuration 86' is a "tower" connection configuration and includes "tower" or insertion portion 96' on which a battery terminal assembly 94' is supported. As discussed above, the "tower" battery 14' may be used with the "tower" power tool 18 and may be charged by the "tower" battery charger 22 without the use of an adapter.

As shown in FIGS. 1–2, the adapter 10 is connectable between the "slide-on" battery 14 and at least one of the "tower" power tool 18 and the "tower" battery charger 22. The adapter 10 includes an adapter housing 98 providing a first connecting portion 102, for connecting the adapter 10 to the battery 14, and a second connecting portion 106, for connecting the adapter 10 to the power tool 18 and/or to the battery charger 22.

In the illustrated construction, the first connecting portion 102 provides a "slide-on" connection configuration similar to the "footprint" of the "slide-on" power tool 18' and/or the "slide-on" charger 22'. The first connecting portion 102 includes a support portion 108 defining a battery attachment axis 110. The support portion 108 includes axially-extending grooves 112 and projections 113. The first connecting portion 102 also includes a first adapter terminal assembly 114 which is electrically connectable to the battery terminal assembly 94. In the illustrated construction, the "slide-on" battery 14 is slidably connectable to the support portion 108 in a first direction along the axis 110.

In the illustrated construction, the battery 14 is selectively connectable to the adapter 10 to have a first orientation (shown in solid lines in FIG. 1B) relative to the adapter 10 and in a second direction along the axis 110 to have a second orientation (reversed from the position shown in solid lines in FIG. 1B) relative to the adapter 10. To accommodate the first and second orientations of the battery 14 relative to the adapter 10, the first adapter terminal assembly 114 includes a forward (for the purposes of description) first adapter terminal assembly 118, which is electrically connectable to the battery terminal assembly 94 when the battery 14 is in the first orientation, and a rearward (for the purposes of description) first adapter terminal assembly 122, which is electrically connectable to the battery terminal assembly 94 when the battery 14 is in the second orientation.

As the battery 14 is connected to the first connecting portion 102, the grooves 92 and projections 93 on the support portion 90 of the battery 14 inter-engage with the grooves 112 and the projections 113 on the support portion 108 of the adapter 10. As the battery 14 is slid onto the support portion 108, the first adapter terminal assembly 114 is electrically connected to the battery terminal assembly 94.

In the illustrated construction, the second connecting portion 106 provides a "tower" connection configuration similar to the "footprint" of the "tower" battery 14'. The second connecting portion 106 includes a "tower" or insertion portion 126 to connect the adapter 10 to the "tower" power tool 18 and/or to the "tower" battery charger 22. The second connecting portion 106 also includes a second adapter terminal assembly 130, which is electrically connectable to the electrical component terminal assembly, such as the motor terminal assembly 54 and/or the charger terminal assembly 78, to electrically connect the adapter 10 to the electrical component, such as the motor 30 and/or the charging circuit 62.

As shown in FIGS. 3–4, the adapter 10 also includes an adapter electrical circuit 134 (schematically illustrated) to electrically connect the first adapter terminal assembly 114 to the second adapter terminal assembly 130. As shown in FIGS. 3–4, the adapter electrical circuit 134 includes electrical components and electrical structure to accommodate the differences between the electrical configuration of the battery 14 and battery terminal assembly 94 and the electrical configuration of the electrical component, such as the motor 30 and/or the charging circuit 62, and electrical component terminal assembly, such as the motor terminal assembly 54 and/or the charger terminal assembly 78.

As shown in FIGS. 1B and 2B, the electrical combination also includes a first locking assembly 138 for locking the battery 14 to the adapter 10. In the illustrated construction, the first locking assembly 138 includes a first locking member or moveable projection 142 supported on the battery 14 and a second locking member or recess 146 defined by the support portion 108. The moveable projection 142 is engageable in the recess 146 to lock the battery 14 to the adapter 10. The first locking assembly 138 also includes an actuator 144 for moving the projection 142 into and out of engagement with the recess 146. A spring (not shown) biases the projection 142 and the actuator 144 to a position in which the projection 142 engages the recess 146. It should be understood that, in other constructions (not shown), the locking members 142 and 146 may be reversed and supported on the adapter 10 and the battery 14, respectively.

The electrical combination also includes (see FIG. 1A) a second locking assembly 150 for locking the adapter 10 to the power tool 18 and/or to the battery charger 22. The second locking assembly includes a first locking member or moveable projection 154 supported on the adapter 10 adjacent the support portion 108 and a second locking member for recess 158 defined by the handle portion 38 of the power tool 18. An actuator 156 moves the projection 154 into and out of engagement with the recess 158. A spring (not shown) biases the projection 154 and the actuator 156 to a position in which the projection 154 engages the recess 158. It should also be understood that, in other constructions (not shown), the locking members 154 and 158 may be reversed and supported on the handle portion 38 and the adapter 10, respectively.

While, in the illustrated construction, the adapter 10 is not locked to the battery charger 22 when used with the battery charger 22, it should be understood that, in other constructions (not shown), a similar locking arrangement may be provided to lock the adapter 10 to the battery charger 22.

To use the "slide-on" battery 14 with the "tower" power tool 18, the adapter 10 is connected between the battery 14 and the power tool 18. As shown in FIG. 1A, the insertion portion 126 of the adapter 10 is inserted into the opening 46 in the handle portion 38 so that the adapter 10 is connected to the handle portion 38 and so that the second adapter terminal assembly 130 is electrically connected with the motor terminal assembly 54. The actuator 156 is released when the insertion portion 126 is fully inserted into the opening 46. The spring moves the projection 154 into engagement with the recess 158 to lock the adapter 10 to the power tool 18.

As shown in FIG. 1B, the battery 14 is then connected to the adapter 10. The battery 14 is slid along the axis 110 so that the connecting portion 90 is connected to the support portion 108. The grooves 92 and 112 and the projections 93 and 113 are inter-engaged to connect the battery 14 to the adapter 10. When the battery 14 has been slid to its furthest extent on the support portion 108, the actuator 144 is released so that the projection 142 engages the recess 146 to lock the battery 14 to the adapter 10. As the battery 14 is slid onto the support portion 108, the first adapter terminal assembly 114 is electrically connected to the battery terminal assembly 94.

As shown in solid lines in FIG. 1B, the battery 14 is in the first orientation relative to the adapter 10 and relative to the power tool 18. In this orientation, the forward first adapter terminal assembly 118 is electrically connected with the battery terminal assembly 94. Once the battery 14 is connected to the adapter 10 and the adapter 10 is connected to the power tool 18, the adapter electrical circuit 134 connects the battery 14 to the motor 30. The power tool 18 may then be operated under the power of the battery 14.

In the reverse position from the position shown in solid lines in FIG. 1B, the battery 14 may be connected to the adapter 10 in the second orientation. In the second orientation, the rearward first adapter terminal assembly 122 is electrically connected to the battery terminal assembly 94.

To remove the battery 14, the actuator 144 is depressed so that the projection 142 is moved out of the recess 146. The battery 14 is then slid along the axis 110 so that the connecting portion 90 is disengaged from the support portion 108. To remove the adapter 10 from the power tool 18, the actuator 156 is depressed so that the projection moves out of engagement with the recess 158. The adapter 10 is then moved outwardly so that the tower portion 126 is removed from the opening 46.

To charge the "slide-on" battery 14 with the "tower" charger 22, the adapter 10 is used to connect the battery 14 to the charger 22. The battery 14 is connected to the adapter 10 as described above. The battery 14 and the adapter 10 are then connected to the charger 22. The tower portion 126 is inserted into the opening 70 so that the second adapter terminal assembly 130 is electrically connected with the charger terminal assembly 78 to electrically connect the battery 14 to the charging circuit 62. The "slide-on" battery 14 may then be charged by the "tower" charger 22.

In the construction illustrated in FIGS. 1–4, the adapter 10 enables a battery having one general configuration, such as the "slide-on" battery 14, to be used with a power tool having another general configuration, such as the "tower" power tool 18. The adapter 10 also enables a battery having one general configuration, such as the "slide-on" battery 14, to be charged by a battery charger having another general configuration, such as the "tower" charger 22.

An alternate construction of an adapter 10' is illustrated in FIGS. 5–7. Common elements are identified by the same reference number "'".

In this alternate construction, the adapter 10' enables a "tower" battery 14' to be used with a "slide-on" power tool 18' and/or to be charged by a "slide-on" charger 22'. The adapter 10' an adapter housing 98' providing a first connecting portion 102', for connecting the adapter 10' to the battery 14', and a second connecting portion 106', for connecting the adapter 10' to the power tool 18' and/or to the charger 22'.

In this illustrated construction, the first connecting portion 102' provides a "tower" connection configuration similar to the "footprint" of the "tower" power tool 18 and/or the "tower" charger 22. The adapter housing 98' defines an opening 162 extending along an opening axis 166. The insertion portion 96' of the "tower" battery 14' is received in the opening 162 to support the battery 14' on the adapter 10'. A first adapter terminal assembly 114' is supported in the opening 162 and is electrically connectable with the battery terminal assembly 94'.

In this illustrated construction, the second connecting portion 106' provides a "slide-on" connection configuration similar to the "footprint" of the "slide-on" battery 14. The adapter housing 98' includes a support portion 170 defining an adapter attachment axis 174. The support portion 170 of the adapter 10' has a construction which is complementary to the construction of the support portion 56' of the "slide-on" power tool 18' and/or to the support portion 80' of the "slide-on" charger 22'. The second connecting portion 106' also includes a second adapter terminal assembly 130', which is electrically connectable to the electrical component terminal assembly, such as the motor terminal assembly 54' and/or the charger terminal assembly 78', to electrically connect the adapter 10' to the electrical component, such as the motor 30' and/or the charging circuit 62'.

As shown in FIGS. 6–7, the adapter 10' also includes an adapter electrical circuit 134' (schematically illustrated) to electrically connect the first adapter terminal assembly 114' to the second adapter terminal assembly 130'. As shown in FIGS. 6–7, the adapter electrical circuit 134' includes electrical components and electrical structure to accommodate the differences between the electrical configuration of the battery 14' and battery terminal assembly 94' and the electrical configuration of the electrical component, such as the motor 30' and/or the charging circuit 62', and electrical component terminal assembly, such as the motor terminal assembly 54' and/or the charger terminal assembly 78'.

In this alternate construction, the electrical combination also includes a first locking arrangement (not shown) for locking the adapter 10' to the battery 14' and a second locking arrangement (not shown) for locking the adapter 10' to the power tool 18' and/or to the charger 22'.

Another alternate construction of an adapter 200 is illustrated in FIGS. 8–9. In this alternate construction, the adapter 200 enables a "slide-on" battery 204 having a different connecting structure to be used with the "slide-on" power tool 18' and/or to be charged by the "slide-on" charger 22'.

The battery 204 has a "slide-on" connection configuration 208 (shown in FIG. 8A) having a different connecting structure than the connection configuration 86 (shown in FIGS. 1B and 2B) of the first "slide-on" battery 14. As shown in FIG. 8A, the connection configuration 208 includes a connecting portion 212 having a generally T-shaped cross-section. The connecting portion 212 includes a battery projection 213 defining a battery groove 214. A battery terminal 216 is supported on the connecting portion 212.

The support portion 56' of the "slide-on" power tool 18' also has a T-shaped cross-section (similar to that of the first connecting portion 102 of the adapter 10). The support portion 56' includes a component projection 217 defining a component groove 218. Similarly, the support portion 80' of the "slide-on" charger 22' has a T-shaped cross-section and includes the projection 217 and the groove 218.

The adapter 200 includes a first connecting portion 220 having a generally C-shaped cross-section and connecting structure complementary to the connecting portion 212 of the battery 204. The first connecting portion 220 includes a first adapter projection 221 defining a first adapter groove 222. A first adapter terminal assembly 224 is supported on the first connecting portion 220 and is electrically connectable with the battery terminal 216.

The adapter 200 also includes a second connecting portion 228 having a generally C-shaped cross-section and connecting structure complementary to the support portion 56' of the power tool 18' and/or to the support portion 80' of the charger 22'. The second connecting portion 228 includes a second adapter projection 229 defining a second adapter groove 230. A second adapter terminal assembly 232 is supported on the second connecting portion 228 and is electrically connectable with the electrical component terminal assembly, such as the motor terminal assembly 54' and/or the charger terminal assembly 78', to electrically connect the adapter 200 to the electrical component, such as the motor 30' and/or the charging circuit 62'.

As shown in FIGS. 9A and 9B, the adapter 200 also includes an adapter electrical circuit 236 (schematically illustrated) to electrically connect the first adapter terminal assembly 224 to the second adapter terminal assembly 232. As shown in FIGS. 9A and 9B, the adapter electrical circuit 236 includes electrical components and electrical structure to accommodate the differences between the electrical configuration of the battery 204 and battery terminal assembly 216 and the electrical configuration of the electrical component, such as the motor 30' and/or the charging circuit 62', and electrical component terminal assembly, such as the motor terminal assembly 54' and/or the charger terminal assembly 78'.

The adapter 200 enables a battery having a first general configuration, such as the second "slide-on" battery 204, to be used with a power tool having the same general configuration, such as the "slide-on" power tool 18', and a different connecting structure (i.e., a physical connecting arrangement different than the physical connecting arrangement of the battery 204 and/or an electrical connecting arrangement different than the electrical connecting arrangement of the battery 204). The adapter 200 also enables the second "slide-on" battery 204 to charged by a battery charger having the same general configuration, such as the "slide-on" charger 22, and a different connecting structure.

Yet another alternate construction of an adapter 200' is illustrated in FIGS. 10–11. Common elements are identified by the same reference number "'".

In this alternate construction, the adapter 200' enables a "tower" battery 204' having a different connecting structure to be used with the "tower" power tool 18 and/or to be charged by the "tower" charger 22. The battery 204' has a "tower" connection configuration 240 (shown in FIG. 10) having a different connecting structure than the connection configuration 86' (shown in FIGS. 1A and 2A) of the first "tower" battery 14'. As shown in FIG. 10, the connection configuration 240 includes a "tower" or insertion portion 244 on which a battery terminal 216' is supported.

As discussed above, the "tower" connection configuration 42 of the power tool 18 includes the opening 46 defined by the handle 38. The "tower" connection configuration 240 of the second "tower" battery 204' is not complementary to this connection configuration 42. For example, the insertion portion 244 may have different dimensions (diameter d, height h, cross-section, etc.) than the dimensions of the opening 46. Similarly, the "tower" connection configuration 240 of the second "tower" battery 204' is not complementary to the connection configuration 66 of the "tower" charger 22.

The adapter 200' accommodates the differences between the connection configuration 240 of the "tower" battery 204' and the connection configuration 42 of the "tower" power tool 18 and/or the connection configuration 66 of the "tower" charger 22. In some constructions, the adapter 200' is preferably formed as a sleeve member to fit between the outer surface of the insertion portion 244 of the battery 204' and the inner surface of the opening 46 of the "tower" power tool 18 and/or of the opening 70 of the "tower" charger 22.

As shown in FIGS. 11A and 11B, the adapter 200' also includes an adapter electrical circuit 236' (schematically illustrated) to electrically connect a first adapter terminal assembly 224' to the second adapter terminal assembly 232'. As shown in FIGS. 11A and 11B, the adapter electrical circuit 236' includes electrical components and electrical structure to accommodate the differences between the electrical configuration of the battery 204' and battery terminal assembly 216' and the electrical configuration of the electrical component, such as the motor 30 and/or the charging circuit 62, and electrical component terminal assembly, such as the motor terminal assembly 54 and/or the charger terminal assembly 78.

Various features of the invention are set forth in the following claims.

We claim:

1. An adapter for use with an electrical component and a battery, the electrical component including a component housing, the battery being electrically connectable to the electrical component to transfer power between the electrical component and the battery, the adapter comprising:

an adapter housing separate from and connectable between the battery and the component housing to support the battery on the component housing; and an adapter electrical assembly electrically connectable between the electrical component and the battery to selectively transfer power between the electrical component and the battery;

wherein the component housing defines an opening, wherein the adapter housing includes an insertion portion insertable into the opening to support the adapter on the component housing;

wherein the adapter housing further includes an adapter support portion connected to the insertion portion, wherein the battery is connectable to and supportable on the adapter support portion; and wherein the battery is selectively connectable to the adapter support portion along a battery attachment axis in a first direction, in which the battery is supported in a first orientation relative to the component housing, and in a second direction, in which the battery is supported in a second orientation relative to the component housing.

2. The adapter as set forth in claim 1 wherein the electrical component is a power tool including a tool housing and a motor supported by the housing, wherein the battery is electrically connectable with the motor to selectively supply power to the motor, and wherein the adapter is connectable between the tool housing and the battery to support the battery on the tool housing.

3. The adapter as set forth in claim 1 wherein the electrical component is a battery charger including a charger housing and a charging circuit electrically connectable to a power source, wherein the charging circuit is electrically connectable with the battery to selectively supply power to the battery to charge the battery, and wherein the adapter is connectable between the charger housing and the battery to support the battery on the charger housing.

4. The adapter as set forth in claim 1 wherein the electrical component further includes a electrical component terminal assembly supported in the opening and electrically connected to the electrical component, and wherein the adapter electrical assembly includes an adapter terminal assembly supported on the insertion portion and connectable to the electrical component terminal assembly to electrically connect the battery to the electrical component.

5. The adapter as set forth in claim 1 wherein the battery is selectively connectable to the adapter support portion along the battery attachment axis in the first direction, in which the battery is supported in a first orientation relative to the adapter, and in the second direction, in which the battery is supported in a second orientation relative to the adapter.

6. The adapter as set forth in claim 1 wherein the battery includes a battery terminal assembly and the adapter electrical assembly includes a forward first terminal assembly and a rearward first terminal assembly, wherein, in the first orientation, the battery terminal assembly is electrically connected to the forward first terminal assembly, and wherein, in the second orientation, the battery terminal assembly is electrically connected to the rearward first terminal assembly.

7. The adapter as set forth in claim 1 wherein the battery includes a battery terminal assembly, wherein the electrical component further includes a component terminal assembly electrically connected to the electrical component, and wherein the adapter electrical assembly includes a first adapter terminal assembly electrically connectable to the battery terminal assembly, and a second adapter terminal assembly electrically connectable to the component terminal assembly to electrically connect the battery to the electrical component.

8. The adapter as set forth in claim 1 and further comprising a locking assembly for locking the battery to the adapter, the locking assembly including a locking member movable between a locked position, in which the battery is locked to the adapter, and an unlocked position, and an actuating member operable to move the locking member between the locked position and the unlocked position.

9. The adapter as set forth in claim 1 and further comprising a locking assembly for locking the adapter to the component housing, the locking assembly including a locking member movable between a locked position, in which the adapter is locked to the component housing, and an unlocked position, and an actuating member operable to move the locking member between the locked position and the unlocked position.

10. An adapter for use with an electrical component and a battery, the electrical component including a component housing, the battery being electrically connectable to the electrical component to transfer power between the electrical component and the battery, the adapter comprising:

an adapter housing separate from and connectable between the battery and the component housing to support the battery on the component housing; and an adapter electrical assembly electrically connectable between the electrical component and the battery to selectively transfer power between the electrical component and the battery;

wherein the battery includes a battery housing having a battery support portion, wherein the component housing has a component support portion, the component support portion not being connectable with the battery support portion to support the battery on the component housing, and wherein the adapter housing includes a first connecting portion having a first adapter support portion connectable with the battery support portion to support the battery on the adapter, and a second connecting portion having a second adapter support portion connectable with the component support portion to support the adapter on the component housing;

wherein the battery support portion defines a battery groove, wherein the component support portion defines a component groove, wherein the first adapter support portion includes a first adapter projection engageable in the battery groove to connect the battery to the adapter, and wherein the second adapter support portion includes a second adapter projection engageable in the component groove to connect the adapter to the component housing.

11. The adapter as set forth in claim 10 wherein battery support portion includes a battery projection, wherein the component support portion includes a component projection, wherein the first adapter support portion defines a first adapter groove, the battery projection being engageable in the first adapter groove to connect the battery to the adapter, and wherein the second adapter support portion defines a second adapter groove, the component projection being engageable in the second adapter groove to connect the adapter to the component housing.

12. An adapter for use with an electrical component and a battery, the electrical component including a component housing defining an opening, the battery being electrically connectable to the electrical component to transfer power between the electrical component and the battery, the adapter comprising:

an adapter housing separate from and connectable between the battery and the component housing to support the battery on the component housing, the adapter housing including
an insertion portion insertable into the opening to support the adapter on the component housing, and
an adapter support portion connectable with the battery to support the battery on the adapter; and an adapter electrical assembly electrically connectable between the electrical component and the battery to selectively transfer power between the electrical component and the battery;

wherein the opening extends along an opening axis, the insertion portion being insertable into the opening along the opening axis, and wherein the battery is connectable to the adapter support portion along a battery attachment axis generally perpendicular to the opening axis.

13. An adapter for use with an electrical component and a battery, the electrical component including a component housing defining an opening, the battery being electrically connectable to the electrical component to transfer power between the electrical component and the battery, the adapter comprising:

an adapter housing separate from and connectable between the battery and the component housing to support the battery on the component housing, the adapter housing including
an insertion portion insertable into the opening to support the adapter on the component housing, and
an adapter support portion connectable with the battery to support the battery on the adapter; and an adapter electrical assembly electrically connectable between the electrical component and the battery to selectively transfer power between the electrical component and the battery;

wherein the battery is selectively connectable to the adapter support portion along a battery attachment axis in a first direction, in which the battery is supported in a first orientation relative to the component housing, and in a second direction, in which the battery is supported in a second orientation relative to the component housing.

14. The adapter as set forth in claim 13 wherein the electrical component is a power tool including a tool housing and a motor supported by the housing, wherein the battery is electrically connectable with the motor to selectively supply power to the motor, and wherein the adapter is connectable between the tool housing and the battery to support the battery on the tool housing.

15. The adapter as set forth in claim 13 wherein the electrical component is a battery charger including a charger housing and a charging circuit electrically connectable to a power source, wherein the charging circuit is electrically connectable with the battery to selectively supply power to the battery to charge the battery, and wherein the adapter is connectable between the charger housing and the battery to support the battery on the charger housing.

16. The adapter as set forth in claim 13 wherein the electrical component further includes an electrical component terminal assembly supported in the opening and electrically connected to the electrical component, and wherein the adapter electrical assembly includes an adapter terminal assembly supported on the insertion portion and connectable to the electrical component terminal assembly to electrically connect the battery to the electrical component.

17. The adapter as set forth in claim 13 wherein the battery is selectively connectable to the adapter support portion along the battery attachment axis in the first direction, in which the battery is supported in a first orientation relative to the adapter, and in the second direction, in which the battery is supported in a second orientation relative to the adapter.

18. The adapter as set forth in claim 13 wherein the battery includes a battery terminal assembly and the adapter electrical assembly includes a forward first terminal assembly and a rearward first terminal assembly, wherein, in the first orientation, the battery terminal assembly is electrically connected to the forward first terminal assembly, and wherein, in the second orientation, the battery terminal assembly is electrically connected to the rearward first terminal assembly.

19. The adapter as set forth in claim 13 wherein the battery includes a battery housing defining a battery groove, and wherein the adapter support portion includes an adapter projection engageable in the battery groove to support the battery on the adapter.

20. The adapter as set forth in claim 13 wherein the battery includes a battery housing having a battery projection, and wherein the adapter support portion defines an adapter groove, the battery projection being engageable in the adapter groove to support the battery on the adapter.

21. An electrical combination comprising:
   a power tool including a tool housing and an electric motor supported by the tool housing and operable to drive a tool element;
   a battery electrically connectable to the motor to selectively power the motor; and
   an adapter separate from and connectable between the battery and the tool housing to support the battery on the tool housing;
   wherein the tool housing defines an opening, wherein the adapter includes an insertion portion insertable into the opening to support the adapter on the tool housing;
   wherein the adapter further includes an adapter support portion connected to the insertion portion, wherein the battery is connectable to and supportable on the adapter support portion; and
   wherein the opening extends along an opening axis, the insertion portion being insertable into the opening along the opening axis, and wherein the battery is connectable to the adapter support portion along a battery attachment axis generally perpendicular to the opening axis.

22. An electrical combination comprising:
   a power tool including a tool housing and an electric motor supported by the tool housing and operable to drive a tool element;
   a battery electrically connectable to the motor to selectively power the motor; and
   an adapter separate from and connectable between the battery and the tool housing to support the battery on the tool housing;
   wherein the tool housing defines an opening, wherein the adapter includes an insertion portion insertable into the opening to support the adapter on the tool housing;
   wherein the adapter further includes an adapter support portion connected to the insertion portion, wherein the battery is connectable to and supportable on the adapter support portion; and
   wherein the battery is selectively connectable to the adapter support portion along a battery attachment axis in a first direction, in which the battery is supported in a first orientation relative to the tool housing, and in a second direction, in which the battery is supported in a second orientation relative to the tool housing.

23. The combination as set forth in claim 22 wherein the power tool further includes a motor terminal assembly supported in the opening and electrically connected to the motor, and wherein the adapter includes an adapter terminal assembly supported on the insertion portion and connectable to the motor terminal assembly to electrically connect the battery to the motor.

24. The combination as set forth in claim 22 wherein the battery is selectively connectable to the adapter support portion along the battery attachment axis in the first direction, in which the battery is supported in a first orientation relative to the adapter, and in the second direction, in which the battery is supported in a second orientation relative to the adapter.

25. The combination as set forth in claim 22 wherein the battery includes a battery terminal assembly and the adapter includes a forward first terminal assembly and a rearward first terminal assembly, wherein, in the first orientation, the battery terminal assembly is electrically connected to the forward first terminal assembly, and wherein, in the second orientation, the battery terminal assembly is electrically connected to the rearward first terminal assembly.

26. The combination as set forth in claim 22 and further comprising a first locking assembly for locking the battery to the adapter and a second locking assembly for locking the adapter to the tool housing.

27. The combination as set forth in claim 26 wherein the first locking assembly includes
   a first recess on the adapter support portion,
   a first projection on the battery, the first projection being movable between a locked position, in which the first projection engages the first recess to lock the battery to the adapter, and an unlocked position, in which the first projection is disengaged from the first recess, and
   a first actuating member operable to move the first projection between the locked position and the unlocked position, and
   wherein the second locking assembly includes
   a second recess on the tool housing,
   a second projection on the adapter, the second projection being movable between a locked position, in which the second projection engages the second recess to lock the adapter to the tool housing, and an unlocked position, in which the second projection is disengaged from the second recess, and a second actuating member operable to move the second projection between the locked position and the unlocked position.

28. A combination for charging a power tool battery, the combination comprising:

a battery charger including a charger housing and a charging circuit supported by the charger housing and selectively electrically connectable with a power source;

a battery electrically connectable with the charging circuit such that the charging circuit selectively supplies power to the battery to charge the battery; and an adapter separate from and connectable between the charger housing and the battery to support the battery on the charger housing and to electrically connect the battery with the charging circuit;

wherein the charger housing defines an opening, wherein the adapter includes an insertion portion insertable into the opening to support the adapter on the charger housing;

wherein the adapter further includes an adapter support portion connected to the insertion portion, wherein the battery is connectable to and supportable on the adapter support portion; and wherein the opening extends along an opening axis, the insertion portion being insertable into the opening along the opening axis, and wherein the battery is connectable to the adapter support portion along a battery attachment axis generally perpendicular to the opening axis.

29. The combination as set forth in claim 28 wherein the charger further includes a charger terminal assembly supported in the opening and electrically connected to the charging circuit, and wherein the adapter includes an adapter terminal assembly supported on the insertion portion and connectable to the charger terminal assembly to electrically connect the battery to the charging circuit.

30. The combination as set forth in claim 28 and further comprising a locking assembly for locking the battery to the adapter, the locking assembly including a locking member movable between a locked position, in which the battery is locked to the adapter, and an unlocked position, and an actuating member operable to move the locking member between the locked position and the unlocked position.

31. The adapter as set forth in claim 28 and further comprising a locking assembly for locking the adapter to the charger housing, the locking assembly including a locking member movable between a locked position, in which the adapter is locked to the charger housing, and an unlocked position, and an actuating member operable to move the locking member between the locked position and the unlocked position.

32. A combination for charging a power tool battery, the combination comprising:

a battery charger including a charger housing and a charging circuit supported by the charger housing and selectively electrically connectable with a power source;

a battery electrically connectable with the charging circuit such that the charging circuit selectively supplies power to the battery to charge the battery; and an adapter separate from and connectable between the charger housing and the battery to support the battery on the charger housing and to electrically connect the battery with the charging circuit;

wherein the battery includes a battery housing having a battery support portion, wherein the charger housing has a charger support portion, the charger support portion not being connectable with the battery support portion to support the battery on the charger housing, and wherein the adapter includes a first connecting portion having a first adapter support portion connectable with the battery support portion to support the battery on the adapter, and a second connecting portion having a second adapter support portion connectable with the charger support portion to support the adapter on the charger housing;

wherein the battery support portion defines a battery groove, wherein the charger support portion defines a charger groove, wherein the first adapter support portion includes a first adapter projection engageable in the battery groove to connect the battery to the adapter, and wherein the second adapter support portion includes a second adapter projection engageable in the charger groove to connect the adapter to the charger housing.

33. The combination as set forth in claim 32 wherein battery support portion includes a battery projection, wherein the charger support portion includes a charger projection, wherein the first adapter support portion defines a first adapter groove, the battery projection being engageable in the first adapter groove to connect the battery to the adapter, and wherein the second adapter support portion defines a second adapter groove, the charger projection being engageable in the second adapter groove to connect the adapter to the charger housing.

34. An electrical combination comprising:

a power tool including a tool housing and an electric motor supported by the tool housing and operable to drive a tool element;

a battery charger including a charger housing and a charging circuit supported by the charger housing and selectively electrically connectable with a power source;

a battery; and an adapter separate from and connectable between the battery and one of the power tool and the battery charger to support the battery on the one of the power tool and the battery charger and to transfer power between the battery and the one of the power tool and the battery charger;

wherein the adapter is alternatively connectable between the battery and the power tool to support the battery on the tool housing and to electrically connect the battery to the motor and between the battery and the battery charger to support the battery on the charger housing and to electrically connect the battery to the charging circuit.

35. The combination as set forth in claim 34 wherein the battery includes a battery terminal assembly, wherein the power tool further includes a motor terminal assembly electrically connected to the motor, wherein the battery charger further includes a charger terminal assembly electrically connected with the charging circuit, and wherein the adapter includes a first adapter terminal assembly electrically connectable to the battery terminal assembly and a second adapter terminal assembly alternatively electrically connectable to the motor terminal assembly to electrically connect the battery to the motor and to the charger terminal assembly to electrically connect the battery to the charging circuit.

36. The combination as set forth in claim 34 wherein the battery includes a battery housing providing a first connection configuration, wherein the one of the power tool and the battery charger provides a second connection configuration different than the first connection configuration, and wherein the adapter includes a first connecting portion having the first connection configuration and connectable with the battery housing to support the battery on the adapter, and a second connecting portion having the second connection configuration and connectable with the one of the power tool and the battery charger to support the adapter on the one of the power tool and the battery charger.

37. A combination for charging a power tool battery, the combination comprising:

a battery charger including a charger housing and a charging circuit supported by the charger housing and selectively electrically connectable with a power source, the charger housing including a charger support portion;

a battery electrically connectable with the charging circuit such that the charging circuit selectively supplies power to the battery to charge the battery, the battery including an insertion portion; and an adapter separate from and connectable between the housing and the battery to support the battery on the charger housing and to electrically connect the battery with the charging circuit, the adapter including an adapter housing defining an opening, the insertion portion being insertable into the opening along an opening axis to support the battery on the adapter, the adapter housing further including an adapter support portion connectable to the charger support portion along an adapter attachment axis, the opening axis being generally parallel with the adapter attachment axis.

38. The combination as set forth in claim 37 wherein the adapter support portion includes an adapter projection and an adapter groove, and wherein the charger support portion includes a charger projection and a charger groove, the adapter projection being engageable with the charger groove and the adapter groove being engageable with the charger projection to connect the adapter to the battery charger.

39. An adapter for use with an electrical component and a battery, the electrical component including a component housing, the battery being electrically connectable to the electrical component to transfer power between the electrical component and the battery, the adapter comprising:

an adapter housing separate from and connectable between the battery and the component housing to support the battery on the component housing; and an adapter electrical assembly electrically connectable between the electrical component and the battery to selectively transfer power between the electrical component and the battery;

wherein the component housing defines an opening, wherein the adapter housing includes an insertion portion insertable into the opening to support the adapter on the component housing;

wherein the adapter housing further includes an adapter support portion connected to the insertion portion, wherein the battery is connectable to and supportable on the adapter support portion;

wherein the opening extends along an opening axis, the insertion portion being insertable into the opening along the opening axis, and wherein the battery is connectable to the adapter support portion along a battery attachment axis generally perpendicular to the opening axis.

40. An electrical combination comprising:

a power tool including a tool housing and an electric motor supported by the tool housing and operable to drive a tool element;

a battery electrically connectable to the motor to selectively power the motor; and an adapter separate from and connectable between the battery and the tool housing to support the battery on the tool housing;

wherein the battery includes a battery housing having a battery support portion, wherein the tool housing has a tool support portion, the tool support portion not being connectable with the battery support portion to support the battery on the tool housing, and wherein the adapter includes a first connecting portion having a first adapter support portion connectable with the battery support portion to support the battery on the adapter, and a second connecting portion having a second adapter support portion connectable with the tool support portion to support the adapter on the tool housing;

wherein the battery support portion defines a battery groove, wherein the tool support portion defines a tool groove, wherein the first adapter support portion includes a first adapter projection engageable in the battery groove to connect the battery to the adapter, and wherein the second adapter support portion includes a second adapter projection engageable in the tool groove to connect the adapter to the tool housing.

41. The combination as set forth in claim 40 wherein battery support portion includes a battery projection, wherein the tool support portion includes a tool projection, wherein the first adapter support portion defines a first adapter groove, the battery projection being engageable in the first adapter groove to connect the battery to the adapter, and wherein the second adapter support portion defines a second adapter groove, the tool projection being engageable in the second adapter groove to connect the adapter to the tool housing.

* * * * *